Feb. 20, 1968     H. M. WENTING     3,369,377

FREEZING BOX FOR PACKED LIQUIDS AND FOODSTUFFS

Filed June 30, 1966

INVENTOR.
HENDRIKUS MARIA WENTING
BY
Nolte & Nolte
ATTORNEYS

United States Patent Office 3,369,377
Patented Feb. 20, 1968

3,369,377
FREEZING BOX FOR PACKED LIQUIDS
AND FOODSTUFFS
Hendrikus M. Wenting, 43 Past. Vranckenlaan,
Reuver, Netherlands
Filed June 30, 1966, Ser. No. 561,820
Claims priority, application Netherlands, July 6, 1965,
65—8,699
1 Claim. (Cl. 62—457)

ABSTRACT OF THE DISCLOSURE

A freezing box or mold is disclosed. The box includes three fixed side walls secured to a bottom, and a fourth wall is pivotally attached to the bottom. A spiral spring, secured to the latter wall is stretched around the other side walls when the box is closed, to prevent expansion of the side walls and to permit easy removal of the frozen material from the box.

---

Figure 1:
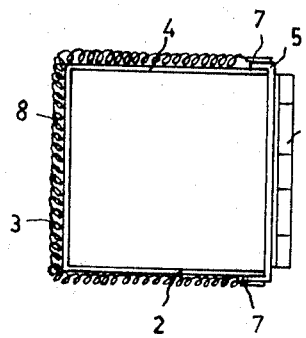

The invention relates to a freezing box or mold for storing packaged frozen liquids and foodstuffs.

An increase of volume of the stored packaged food products occurs during freezing in accordance with the moisture content of the stored product. The increase in volume of the stored frozen product or block causes the frozen product to be pressed against the walls of the freezing box and as a consequence the frozen product becomes firmly adhered to the walls of the freezing box. By packaging the liquids or food in a polyethylene bag, they can be removed from the freezing box only after the freezing box is heated. As a result of the heating the outer layer of the frozen block is defrosted loose, so that removal of the block is possible. The great pressure of the frozen block against the walls of the freezing box can even cause mechanical deformation of the freezing box. If such a deformation appears to be greater in the middle of the freezing box than at the top or the bottom, the frozen block can only be removed after protracted defrosting.

Dutch patent specification 108,224 describes a freezing mold wherein two opposite walls are pressed together at their greatest surfaces by elasticity. The product to be frozen is thereby prevented from being pressed too strongly against the walls as a consequence of its increase of volume and could only be removed from the freezing mold by protracted defrosting and/or by great mechanical forces. The freezing mold can be filled from the top and is provided with a bottom that can be turned away, but it remains necessary to defrost the block before it is removed from the freezing box by mechanical means.

It is, therefore, an object of the present invention to provide a freezing box from which the frozen block can be removed easily without defrosting and without mechanical means. In accordance with this object, a freezing box or mold is provided which is suitable for freezing packed liquids and foodstuffs in freezers or deep-freezers which need not be immersed in a liquid cooling means and in which no special demands need be made with respect to a water-tight sealing between the movable parts of the freezing box. The freezing box can therefore have a simple construction. The use of toggles and clamps is avoided, since there is a risk that these will get stuck as a consequence of condensation and can then be opened only with difficulty.

The freezing box according to the invention is characterized in that it consists of an inversed tank-shape bottom to which three walls formed from one plate are fixed and a fourth wall is pivoted. A spiral spring is secured to the fourth wall. In the closed condition of the freezing box the spiral spring is stretched around the other three walls.

Figure 2:
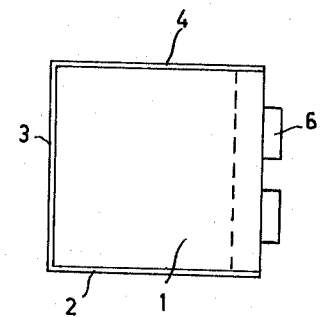
Figure 3:
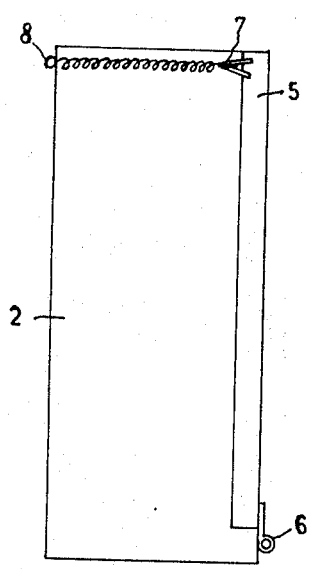
Figure 4:
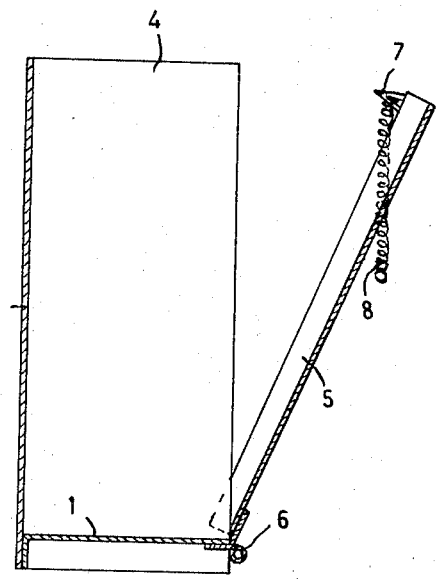

The subject matter which I regard as my invention is particularly pointed out and distinctly claimed in the concluding portion of this specification. The invention itself, however, together with further objects and advantages thereof may be best understood by reference to the following description taken in conjunction with the accompanying drawing in which:

FIGURE 1 is a top view of the closed freezing box according to this invention;
FIGURE 2 is a top view of the freezing box shown in FIG. 1 with the pivoted wall removed;
FIGURE 3 is a side view of the closed freezing box of FIG. 1; and
FIGURE 4 is a longitudinal section of the opened freezing box.

Referring now to the embodiment of this invention shown in FIGS. 1-4, the freezing box or mold is formed by side walls 2, 3 and 4 spotwelded to the inversed, tank-shaped bottom 1. A wall 5 is pivotably secured by means of the pivots 6 to bottom 1. A spiral spring 8 is hooked in eyes 7 which are spotwelded against the bent parts of the wall 5. In the place where the walls 2, 3 and 4 are secured to the bottom 1, the bottom 1 is bent rectangularly into an open tank which forms a simple reinforcement by securing the downwardly bent portion of bottom 1 to the lower portions of walls 2, 3 and 4 as shown best in FIG. 4. The non-bent side of the bottom 1 is reinforced by a segment of the pivot 6 secured by any conventional means, such as brazing or welding, to the underside of bottom 1. The other segment of the pivot 6, secured by similar securing means to the lower portion of wall 5, acts as reinforcement of the wall 5. The freezing box is closed when the spiral spring 8 is stretched about the walls 2, 3 and 4. The wall 5 is then pressed strongly against the free vertical sides of the walls 2 and 4, whereas the bent parts of the wall 5 are situated against the outer side of the walls 2 and 4. The thus closed freezing box has now an opening only at the upper side, through which filling can take place. As the volume of the frozen block stored within the freezing box increases during freezing the pivoted wall 5 can yield a little and the fracturing of the block is prevented. The frozen block can subsequently be removed from the freezing box without defrosting by pushing the spiral spring 8 from the three walls 2, 3 and 4 with a single motion of the hand and by folding the wall 5 downwards. The material from which the freezing box can be manufactured is preferably stainless steel or plastic. The thickness of this material can be very small. The freezing box of this invention is furthermore attractive for small quantity consumers who are able to readily store therein quantities of frozen food.

It will be also apparent that many modifications may be made to the freezing box disclosed herein without departing from the invention. It is, therefore, intended in the appended claim to cover all such equivalent modifications and variations that fall within the true spirit and scope of the invention.

What is claimed is:
1. A freezing box or mold for retaining a food package in frozen form comprising, an inversed tank shaped bottom, first and second side walls and a rear wall fixedly secured to said bottom, a front wall, pivot means pivotally securing said front wall to said bottom, a spring secured at both of its ends to the upper portion of said front wall and extending about said first and second side walls and said rear wall when said box is in its closed position, said bottom including a downwardly depending bend secured to the lower portions of said rear and side walls to form a reinforcement therewith, said pivot means comprising a first and second segment, said first segment being secured to the underside of said bottom to form a reinforcement therewith, said second segment being secured to the lower portion of said front wall to form a reinforcement therewith.

References Cited

UNITED STATES PATENTS

| 227,814 | 5/1880 | Morgan | 249—170 |
|---|---|---|---|
| 949,619 | 2/1910 | Burch | 292—258 |
| 1,513,581 | 10/1924 | Caumont | 292—258 X |
| 1,778,625 | 10/1930 | Davis | 220—35 |
| 2,736,277 | 2/1956 | Cole | 249—170 |
| 2,984,511 | 5/1961 | Hedrick | 220—55.7 |

LLOYD L. KING, *Primary Examiner.*